United States Patent [19]
Vander Mey et al.

[11] Patent Number: 5,574,748
[45] Date of Patent: *Nov. 12, 1996

[54] SPREAD SPECTRUM COMMUNICATIONS SYSTEM FOR NETWORK

[75] Inventors: James E. Vander Mey; Timothy J. Vander Mey, both of Ocala, Fla.

[73] Assignee: Intellon Corporation, Ocala, Fla.

[*] Notice: The term of this patent shall not extend beyond the expiration date of Pat. No. 5,090,024.

[21] Appl. No.: 445,931

[22] Filed: May 22, 1995

Related U.S. Application Data

[63] Continuation of Ser. No. 72,705, Jun. 7, 1993, abandoned, which is a continuation of Ser. No. 775,279, Oct. 11, 1991, abandoned, which is a continuation of Ser. No. 397,803, Aug. 23, 1989, Pat. No. 5,090,024.

[51] Int. Cl.$^6$ .................................................. H04L 27/30
[52] U.S. Cl. .................... 375/204; 375/207; 370/85.2; 370/85.3
[58] Field of Search .................................. 375/200, 207, 375/204, 343; 380/34; 370/85.3, 85.2; 340/825.5

[56] References Cited

U.S. PATENT DOCUMENTS

| | | | |
|---|---|---|---|
| 3,665,474 | 5/1972 | Thayer | 343/200 |
| 3,691,464 | 9/1972 | Dayton et al. | 325/55 |
| 4,037,159 | 7/1977 | Martin | 325/30 |
| 4,100,498 | 7/1978 | Alsup et al. | 328/14 |
| 4,189,713 | 2/1980 | Duffy | 340/168 |
| 4,200,862 | 4/1980 | Campbell et al. | 340/310 |
| 4,244,053 | 1/1981 | Clinch et al. | 455/29 |
| 4,300,235 | 11/1981 | Outram | 375/1 |
| 4,377,754 | 3/1983 | Thompson | 307/114 |
| 4,409,592 | 10/1983 | Hunt | 370/94 |
| 4,409,593 | 10/1983 | Bose | 340/825.5 |
| 4,438,519 | 3/1984 | Bose | 375/1 |
| 4,468,792 | 8/1984 | Baker et al. | 375/45 |
| 4,517,679 | 5/1985 | Clark et al. | 375/37 |
| 4,608,559 | 8/1986 | Friedman et al. | 340/825.5 |
| 4,628,440 | 12/1986 | Thompson | 364/140 |
| 4,638,299 | 1/1987 | Campbell | 340/310 |
| 4,641,322 | 2/1987 | Hasegawa | 375/1 |
| 4,649,549 | 3/1987 | Halpern et al. | 380/32 |
| 4,651,327 | 3/1987 | Fujita | 375/1 |
| 4,653,076 | 3/1987 | Jerrim et al. | 375/115 |
| 4,656,642 | 4/1987 | Apostolos et al. | 375/1 |
| 4,682,324 | 7/1987 | Ulug | 370/85.3 |
| 4,691,326 | 9/1987 | Tsuchiya | 375/1 |

(List continued on next page.)

FOREIGN PATENT DOCUMENTS

| | | | |
|---|---|---|---|
| 085753 | 8/1983 | European Pat. Off. | H04B 3/54 |
| 0195573 | 9/1986 | European Pat. Off. | |
| 2098030 | 11/1982 | United Kingdom | H04B 3/54 |
| 2094598 | 9/1992 | United Kingdom | H04B 3/54 |

OTHER PUBLICATIONS

Piety, "Intrabuilding Data Transmission Using Power–Line Wiring," Hewlwtt–Packard Journal, pp. 35–40 (May 1987).
Roddy et al., Electronic Communications, Reston Publishing, pp. 385–387, 703–704, 3rd Edition, No Date.
R. Dixon, *Spread Spectrum Systems*, John Wiley & Sons, Inc. (1984).
European Search Report dated Aug. 14, 1992, For. EP90309129.6.

*Primary Examiner*—Stephen Chin
*Assistant Examiner*—T. Ghebretinsae
*Attorney, Agent, or Firm*—Fish & Richardson P.C.

[57] ABSTRACT

Spread spectrum chirps (i.e., wideband frequency packets) are propagated on a local area network in a hostile communications environment, such as a powerline or a crowded radio frequency band. Chirps are self-synchronizing, data bit (or subdata bit) in length and detectable by all network nodes, to allow the contention resolution and collision detection needed to support carrier-sense based network protocols. A matched filter of the same time length and encoding sequence as the transmitted chirp provides the self-synchronized chirp reception at each receiver.

44 Claims, 3 Drawing Sheets

U.S. PATENT DOCUMENTS

| | | | |
|---|---|---|---|
| 4,703,474 | 10/1987 | Foschini et al. | 370/18 |
| 4,707,839 | 11/1987 | Andren et al. | 375/1 |
| 4,724,435 | 2/1988 | Moses et al. | 375/1 X |
| 4,755,792 | 7/1988 | Pezzolo et al. | 340/538 |
| 4,763,103 | 8/1988 | Galula et al. | 340/310 R |
| 4,860,307 | 8/1989 | Nakayama | 375/1 |
| 4,864,589 | 9/1989 | Endo | 375/1 |
| 4,866,732 | 9/1989 | Carey et al. | 375/1 |
| 4,866,733 | 9/1989 | Morishita | 375/1 |
| 4,884,284 | 11/1989 | Nakayama | 375/1 |
| 4,969,159 | 11/1990 | Belcher et al. | 375/1 |
| 4,975,926 | 12/1990 | Knapp | 375/1 |
| 4,984,247 | 1/1991 | Kaufman et al. | 375/1 |
| 5,042,083 | 8/1991 | Ichikawa | 370/85.3 X |
| 5,132,986 | 7/1992 | Endo | 375/1 |

SPREAD SPECTRUM COMMUNICATIONS SYSTEM FOR NETWORK

This is a continuation of application Ser. No. 08/072,705, filed Jun. 7, 1993, now abandoned, which is a continuation of application Ser. No. 07/775,279, filed Oct. 11, 1991, now abandoned, which is a continuation of application Ser. No. 07/397,803, filed Aug. 23, 1989, now issued U.S. Pat. No. 5,090,024.

BACKGROUND OF THE INVENTION

1. Field of the Invention

This invention relates to use of broadband communications for a network. More specifically, the invention relates to use of spread spectrum communications on a noisy network media such as a powerline using carrier sensing protocols.

2. Description of the Prior Art

The use of spread spectrum communications for more reliable and secure communications is well-known. By transmitting an information signal over a frequency spectrum that is broad with respect to the information bandwidth, and in a manner that can be decoded/despread at the receiver, several benefits are realized. First, any particular narrow band frequency impairments due to interference or attenuation will not necessarily impair the received signal because of the redundancy of spectrum used for the information signal. Secondly, the encoding/spreading technique can be chosen such that performing the inverse function (decoding/despreading) on the received signal effectively spreads any received interfering signal or "noise" in the process, thereby minimizing the impact of such noise at the receiver.

Spread spectrum for data communications, in its well known form, can be achieved in several ways. Typically, the methods used are classified as variations of the "direct sequence" or "frequency hop" techniques. (See, for instance, *Spread Spectrum Systems*, Second Edition, by Robert C. Dixon, John Wiley & Sons, 1984.) Each of these methods share the requirement of a synchronization process. This process must take place in order to establish a connection between the transmitter and receiver. The purpose of this synchronization is to allow the transmitter and receiver to follow the same encoding and decoding process in time synchronization—whether it be code transitions of direct sequence type modulation or frequency hold transitions. This synchronization process can be accomplished in a number of well-known ways. Once synchronization is established between a transmitter and a receiver, data is generally transferred by modulating the higher frequency encoding/spreading signal with the information signal.

As long as the transmitter and receiver stay in synchronization, the data communications capability of the link is enhanced by the spreading function of the encoding signal. Since the receiver is locked in time to the encoding pattern, the receiver averages out over a period of time (correlates) the encoded signal through possible interference, and then demodulates the received information signal from the recovered encoding signal. Interfering signals are first spread by the decoding process, and then filtered by the correlation/demodulation process. The ability to reject high levels of interfering signals is one of the primary benefits of spread spectrum communications.

It is the encoding characteristic that also allows spread spectrum communications to be more secure. By selecting an encoding and synchronization process based on a psuedo-random number sequence of long length, which sequence is known only to the intended receiver, a transmitter can establish communications with the intended receiver that is difficult for any eavesdropping receiver to synchronize to, since the code sequence is unknown to the eavesdropper. In network applications, however, such secure communications are not usually required, at least at the physical level of transmission.

The synchronized communication characteristic of spread spectrum is also why spread spectrum is believed to be unsuitable for carrier-sense based networks—those that allow multiple access to a media using carrier-sense techniques for contention resolution and collision detection (e.g., CSMA/CD networks such as Ethernet, and the proposed EIA CEBus network). The reason that the prior art spread spectrum is unusable in these connectionless packet-oriented carrier-sense based networks, is that spread spectrum is basically a "connected" communications protocol that to the extent possible ignores the rest of what is happening when a "connection" has been established. A transmitter, even with the same encoding technique, will not be received by a receiver that is synchronized to and receiving from another transmitter, if it is at least marginally out of phase in time (out of synchronization). In fact, a common "network" technique with spread spectrum communications is to use Code Division Multiple Access. Simply put, this is a number of "connected" (synchronized) transmitters and receivers sending and receiving simultaneously, each "connection" using a different code sequence, unaware of the existence of the others. In fact they can all be using the same encoding sequences as long as any transmitter/receiver pair is synchronized to a different point in the encoding sequence than is any other pair at any point in time.

In a network where the media carrier signal is managed and only one transmitter is normally allowed to operate at one time, techniques of contention-resolution and collision-detection are used to arbitrate the use of the carrier on the media. These techniques depend on the ability of any receiver to detect the presence of a signal "carrier" on the media at any instance in time. In spread spectrum this is not practical, since only if synchronization is achieved can the system determine the presence of a "carrier", and then once synchronization is achieved, no other "carrier" (interference-collision) will be detected. Typically, this synchronization process is non-trivial, and requires time to achieve well beyond that allowed for "carrier-detect" in such networks.

The networks referred to here may reside on any media that allows managed multiple accesses. In the case of typical LAN-type networks, such as Ethernet, the media usually consist of a coaxial cable and connections meeting certain stringent requirements. In this case, the use of spread spectrum communications would typically not be beneficial, since the media is typically well behaved electrically and relatively noise-free. In the case of other media, however, where the environment is not so well behaved or easily controlled, or is potentially noisy or suffers from variable attenuation or other flaws, the benefits of spread spectrum communications could be substantial.

The transmission characteristics of an AC powerline (a typically noisy media) often exhibit narrow band impairments. Most previously known powerline carrier communications systems utilize a single carrier frequency (ASK modulation) or a narrow band of frequencies (FSK modulation), thus making existing systems susceptible to these commonly found narrow band impairments. If these impairments approximately line up with the carrier frequency the system no longer functions properly. The ASK method of modulation, usually at 120 KHz, is by far the most common method in use today especially in the residential (consumer) market.

SUMMARY OF THE INVENTION

In accordance with the invention, a method is provided that offers the substantial benefits of spread spectrum communications in network environments that use carrier-sense based protocols. The use of spread spectrum technology, for example, on normal 120 volt AC (alternating current) power distribution lines (powerlines) allows more reliable communications than prior art narrow band techniques. Spread spectrum technology has been used previously on AC powerlines successfully in point-to-point (non-network) applications, for example in the commercially available NEC spectrum AC powerline product, to achieve reliable and high rate throughput, but has not been employed heretofore in a managed multiple access (carrier-sense) network type environment on a powerline.

The method described here differs from prior art spread spectrum in that it does not require a specific synchronization state or process prior to transmission of data, and thus provides the equivalent of a spread spectrum carrier. This is accomplished in one embodiment by using a specific encoding sequence (e.g. frequency hop or shift or direct code modulation) to send each data bit on the media as a separately encoded entity. By employing a matched filter in the receiver of the same time length and encoding sequence as that of the transmitted data bit, the data bit can be received directly in one bit time. No separate synchronization is required, as the same encoding pattern is used with successive data bits. The data stream is then sent as a continuous series of these encoded sequences, each having a change of frequency over a time interval, which are called data chirps (i.e., pulsed frequency modulated signals). In other embodiments, the data bit may include multiple data chirps. If all receivers on the network employ the same decoding filters, the presence of a carrier (data chirp) is always detectable.

This technique is analogous to that used in some radar systems where a spread spectrum radio frequency chirp (typically a linearly swept frequency), is transmitted and the echo is received back and processed through a matched filter to detect its presence. These filters are typically Surface Acoustic Wave (SAW) devices. The presence of a spread spectrum chirp is detected at the output of the matched filter, with a time-compression equivalent to the gain of the filter. In this application the filter is used to positively detect the presence of the radar echo and provide a time resolution gain to establish a more accurate distance of the object reflecting the chirp.

As in the above described radar system, one embodiment of the present invention also employs individual chirps and a matched filter receiver. These chirps preferably are sent in continuous sequence and need not be of the swept frequency variety. In other embodiments, the chirps are of the log sweep, psuedo-random, or time hopping type. Also the matched filter used is preferably a low cost implementation of a delay line matched filter such as that described below, instead of a SAW device.

One object of the present invention is to use a wide band signal where the spreading function is independent of the data (spread spectrum) to eliminate or considerably reduce the effects of the narrow band impairments.

All prior art ASK systems such as those sold by X10, Black and Decker, and the new CEBus Standard under development by the EIA (all of which use 120 KHz ASK modulation) can be used in conjunction with the present invention by substituting the wide band swept chirp for the single carrier frequency of the prior art. In one embodiment, during each chirp the frequency is swept from 50 KHz to 50 KHz during the carrier ON interval of the ASK modulated system. This effectively eliminates the narrow band impairment problem of the prior art since a substantial percentage of the frequencies covered by the wide band sweep (chirp) can be lost without losing the data present in the chirp, and thus the existing systems and the CEBus Standard can be easily retrofitted to operate in accordance with the invention, resulting in a considerable improvement in performance. This performance improvement is desirable in both residential and commercial powerline communications systems.

One of the most expensive performance requirements of prior art spread spectrum signals is the synchronization requirement. In most spread spectrum systems, considerable receiver complexity is needed to properly synchronize with the incoming signal. In addition to receiver complexity, the stability of both the transmitter and receiver clocks is important for long packets, since synchronization once obtained must be maintained for the duration of the packet. If the differential clock drift over the packet length of both the chirp generating transmitter clock and receiver clock is greater than half the bit period over the packet length, errors will result. In accordance with the present invention, the system instead synchronizes on each bit (chirp). There is no separate synchronization field or area of the packet or chirp and, therefore, clock generators can be low cost since the problematic drift interval is reduced to the data bit time rather than the packet time. Also, the receiver needs no special synchronization circuitry, which provides a considerable cost savings.

Other hostile or uncontrolled media in addition to powerlines, such as radio frequency and infrared local networks, are suitable for application of the present invention. In the case of multiple media networks, such as the proposed EIA CEBus home control network, spread spectrum techniques may be the best choice for a number of media, such as the powerline, radio frequency, infrared media, and twisted pair due to crosstalk considerations with other twisted pairs in the same bundle (e.g. telephone lines with noisy modems/ facsimile machines, etc.). The desirability of commonality also suggests application of the invention to well-behaved media such as coaxial cable and fiber optics. The use of wideband communication in accordance with the invention advantageously allows transmission of data at a higher data rate in various media than does the prior art.

DETAILED DESCRIPTION OF THE INVENTION

Figure 1:
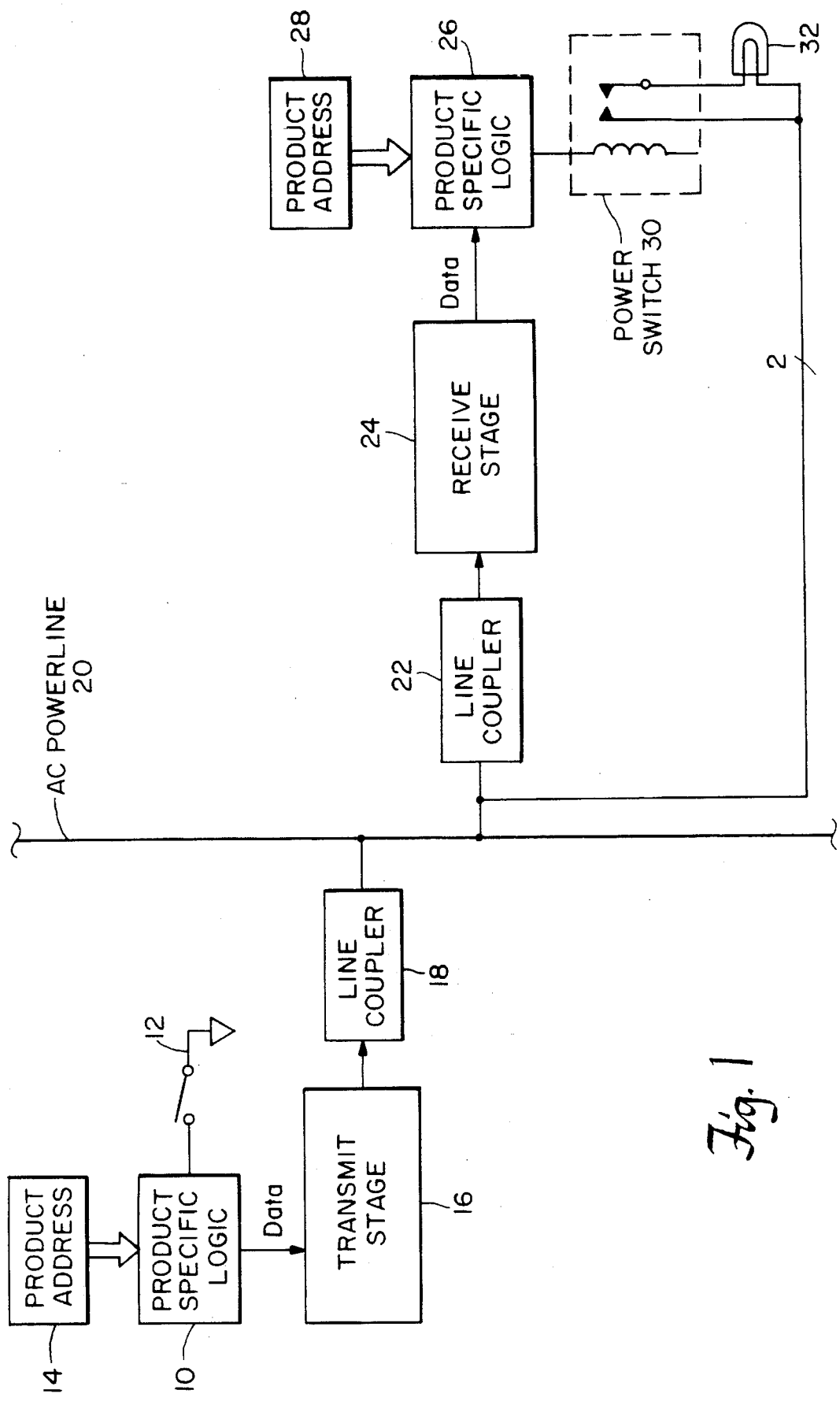
FIG. 1 shows a system including one embodiment of the present invention.

FIG. 1 shows a typical household system for control of an electric light in accordance with the invention. The controlling portion of the system at the transmitting end includes conventional product specific logic 10 and an on-off switch 12 controlled by the product specific logic 10, and conventional product address circuitry 14 which provides a product address to the product specific logic 10.

The product specific logic 10 provides data (i.e., turning the light on or off) to the transmit stage 16. The transmit stage 16 is conventionally coupled by a line coupler circuit 18 to the alternating current (AC) powerline 20 in the house.

At the receiving and power control end of the system, the receive stage 24 is coupled by a second line coupler circuit 22 to the AC powerline 20. The receive stage 24 recovers data provided by the transmit stage 24 from the signals on the powerline 20, and provides the data to the product specific logic 26. A second product address is provided to the product specific logic by product address circuitry 28. Using the data, the product specific logic 26 controls a power switch 30 (shown as including a relay) to turn power on or off to a light 32 which in turn is conventionally connected to powerline 20.

The above described system is thus conventional in several respects and the well known aspects of such a system are disclosed in, for instance, U.S. Pat. No. 4,755,792, issued Jul. 5, 1988 to Pezzolo et al. In accordance with the present invention, the transmit stage 16 and receive stage 24 are both different from that in the prior art systems, and are described in further detail below.

In the network application of the present invention, the purpose of the chirp is to provide a minimal unit time for carrier emulation (usually a data bit time or submultiple thereof) and provide the spread spectrum processing gain and interference spreading inherent in the use of a delay line matched filter. The processing gain of the matched filter defines the ratio of the chirp transmit time to the valid filter correlator output time. If a single chirp represents a data bit, it is known that the gain ratio of the matched filter is equivalent to the ratio of the number of chirps per bit in direct sequence type spread spectrum systems.

The chirp to be transmitted can be in any number of wideband signal formats. For example, swept frequency chirps are used in one embodiment. A chirp in which the frequencies are swept linearly (i.e., the frequency changes linearly over time) results in a chirp that has energy evenly distributed over the swept frequency spectrum. Alternately, a non-linear sweep is used to tailor the energy at various frequencies, as is best suited for the media used as the transmission channel.

Direct sequence code generated frequency chirps are also used in another embodiment. As is common in many spread spectrum applications, these wideband spectrum chirps are generated using psuedo-random maximal linear codes and a modulation technique such as binary or quadrature phase shift keying (BPSK/QPSK). Each chirp that is separately decodable has a unique code sequence.

The modulation of the encoding sequence for each bit can be accomplished in several ways in accordance with the invention. One implementation for a two-state data stream is to send a linearly swept frequency sequence in opposite polarity phases (180 degree phase shift) depending upon which state (e.g. "0" or "1") of data is to be represented. This will result in the receiver matched filter using the same correlation network to generate either a positive or negative correlation output, reflecting which of the two states has been received. Alternately, the matched filter can have more than one correlation network connected to its internal delay line to receive multiple symbol states if desired. These symbols may include for example data bits and control field delimiters. Another embodiment includes multiple sub-symbol length chirps to encode the symbols.

Network nodes not immediately involved in a data transfer but seeking access, can continuously monitor the media, as required by the network contention rules, and would be able to detect the presence of "carrier" (data) being sent by any other node. In the event of simultaneous contention for the media by more than one node, the network rules normally allow for the detection of collisions—either during a packet preamble time, during a packet transfer, or upon receipt of an (invalid) packet. In the latter case, the network protocol rules provide for the appropriate retransmission. In the former cases, the network protocol rules may or may not require the receiving and transmitting nodes that currently are transferring a packet of data to monitor the media for carrier collisions (i.e. simultaneous interfering carrier from another node).

If such monitoring is required, during the portion of time that nodes are to monitor for collisions, the receiver (or listening transmitter) can regard any correlated output that is detected, other than its own, as a carrier collision. The discrimination of a carrier collision correlation output from a correctly received/transmitted data bit can be accomplished by synchronizing the receiver matched filter to the transmitter's bit data rate. This requires a constant rate and continuous data stream from the transmitter at a rate known to the receiver. The valid output of the delay line matched filter is then synchronized to the data rate as a narrow period (window) of time, which is nominally equal to the data bit time divided by the gain of the filter. If a correlation signal occurs outside of this window, the signal is presumably some other colliding signal.

A colliding signal is not necessarily harmful to the successful transmission of the data packet in progress. This collision condition is similar to the Code Division Multiple Access (CDMA) case of multiple transmitters/receivers using the same code sequence as described above. Simply ignoring all correlating signals at other than the correct time window eliminates all colliding signals except those that are in exact time phase (synchronization) as the transfer in progress.

When the network rules allow, either because they do not require the nodes transferring data at some (or all) times to monitor the media for carrier collisions, and/or use invalid packet transfer as collision indications, the data transfer integrity can be enhanced by data stream synchronization. This is accomplished as described above by limiting the valid receive filter correlation output to the anticipated correlation time window in succeeding data bits. In order for this data stream synchronization to occur, the transmitter must send data chirps at a constant frequency and the receiver must receive them at the same rate. When this data stream synchronization is accomplished, it can be shown that the resultant data transfer robustness is equivalent to that of a similarly encoded prior art spread spectrum system of the same gain.

Slight variations in data stream frequency can be tolerated by appropriate receiver design. For example, the receiver could open up the correlation window by the anticipated maximum time offset error for any single data chirp and then reset the time to the next window on each data chirp received. This method would allow the receiver to track any transmitter within the design error tolerances.

An element of the cost-effective implementation of this described method which allows use in low-cost home-type networks (in addition to less cost-sensitive commercial networks) is the availability of an inexpensive delay line matched filter, such as that described below and in the above cited copending patent application.

The spread spectrum powerline communication system in accordance with the invention in one embodiment uses discrete frequency sweeps (chirps) to transmit information. Two kinds of sweeps are used, one corresponding to a logical "1" and one corresponding to a logical "0". The "0" sweep is the amplitude inversion of the "1" sweep. Synchronization occurs after the reception of three contiguous "1"'s, and is terminated by the loss of continuous data reception.

The sweep (or chirp) consists of a sine wave (or triangle wave) which is linearly frequency swept through the transmission band. A log sweep is used in a second embodiment. The reception of the waveform is accomplished by continuously measuring and storing the incoming signal's slope direction. When this stored pattern sufficiently matches the ideal waveform pattern, correlation is declared.

Signal pattern matching is done by first storing the received signal's slope directions in a digital FIFO (first in, first out) circuit. The appropriate inverting and non-inverting taps of the FIFO which correspond to the ideal signal pattern are then summed through resistor summing networks. When the summed voltage reaches sufficient potential, correlation is declared. To illustrate this, suppose the signal received exactly corresponds to the ideal "1" signal. Upon complete reception of this signal, all the inputs to the summing network would be "high", thus raising the output of the summing network above the correlation threshold.

Figure 2:
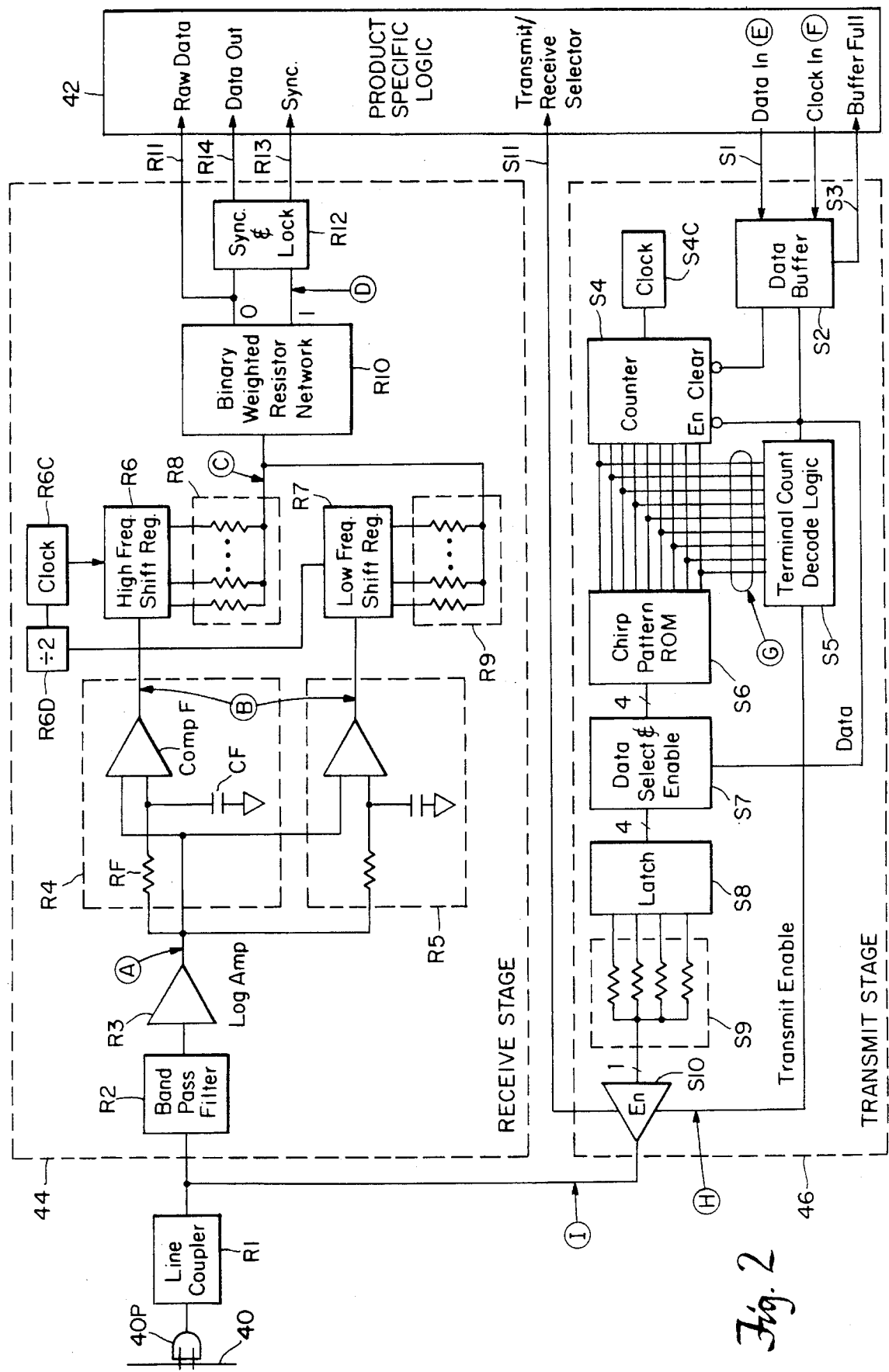
FIG. 2 shows one embodiment of the present invention in block diagram form.

One embodiment of the invention is shown in FIG. 2. In this embodiment, both the transmit stage and the receive stage of FIG. 1 are included in one receive-transmit power line modem for one node on the network.

The following describes the RECEIVE stage 44.

An advantage of the sign of slope method of matching a received signal to a ideal signal in accordance with the invention is that it is independent of received signal amplitude. That is, the receiver is looking only to the direction of the signal. This allows for the introduction of signal processing prior to the matched filter to enhance its performance. A non-linear signal compressing circuit such as a logarithmic amplifier improves the signal-to-noise performance in an environment where noise is dominant, since the ratio of the dominant noise to signal is reduced. In an environment where the signal to noise ratio is positive (more signal than noise) this logarithmic amplifier is also usable, since the logarithmic amplifier would in the worst case cause the signal-to-noise ratio to approach zero, and this filter is designed to operate reliably even in the negative signal-to-noise area.

The following elements are shown in the RECEIVE stage 44.

R1-ISOLATION TRANSFORMER: The isolation transformer (i.e., line coupler R1) performs impedance matching and current gain functions as well as high frequency AC coupling the circuit to the AC powerline 40 via conventional plug 40P.

R2-BANDPASS FILTER: The band pass filter R2 limits unwanted signals outside the pass band. This filter R2 preferably has an approximately constant group delay for the frequencies in the pass band.

R3-LOGARITHMIC AMPLIFIER: The logarithmic amplifier R3 is a nonlinear amplifier used to improve the signal-to-noise ratio when that ratio is less than 0 db. The amplifier also provides drive current for the SLOPE DETECT COMPARATORS R4, R5.

Logarithmic or similar non-linear signal compression preprocessing also improves the dynamic range of the receiver 44, since it compresses larger signals more than smaller signals. In many cases, this may eliminate the need for automatic gain control devices.

R4-SLOPE DETECT COMPARATOR #1: The slope detect comparator R4 compares the current signal voltage with that same signal delayed in time. The result of this comparison will be a voltage proportional to the direction of the slope of the signal. Slope detect comparator #1 R4 is used for comparing the frequency components of the signal which lie in the upper half of the full signal frequency band. The delay time is approximately equal to one quarter of the period of the average frequency in this upper half of the band.

R5-SLOPE DETECT COMPARATOR #2: This comparator R5 is identical in operation to the above comparator, but is used for comparing the frequency components of the signal which lie in the lower half of the full signal frequency band. Its delay time is approximately equal to one quarter of the period of the average frequency in this lower half of the band.

The two slope detect comparators function as an analog-to-digital converter "front end" to the receiver 44. The analog-to-digital front-end is a "sign of slope" detector, and determines the amplitude direction and not the actual amplitude of the received signal. Its output at any point in time is one of two states, indicating a rising or falling amplitude of the signal being received.

Such a detector can be implemented with a single comparator using an RC ( i.e., resistor-capacitor) filter circuit including resistor RF and capacitor CF (as shown for R4) on one comparator COMPF input. The input signal is fed to one input of the comparator COMPF and the RC filter delayed signal to the other input of comparator COMPF. The output of the comparator COMPF then continuously indicates the rising or falling direction (sign of slope) of the amplitude of the signal being received.

The value of the time-constant of the RC filter used at the input to the comparator COMPF determines the amount of time over which the slope of the input signal is measured to determine its direction. An appropriate slope time is selected to match the desired frequency being sampled. For optimal results, the RC time-constant value chosen is such that the slope measurement time is equal to ½ the period of the frequency being sampled.

R6-HIGH FREQUENCY SHIFT REGISTER: The output of SLOPE DETECT COMPARATOR #1 R4 is clocked into the high frequency shift register R6 by clock R6C at a frequency at least four times the maximum frequency of the swept signal. The number of stages is sufficient to hold enough data to cover half of the signal sweep time. Since the signal is swept from low to high frequency, at the termination of the received sweep register R6 contains the slopes of the high frequency half of the signal.

R7-LOW FREQUENCY SHIFT REGISTER: The output of SLOPE DETECT COMPARATOR #12 R5 is clocked into the low frequency shift register R7 at one half the clock rate of the high frequency register by clock R6C and divider R6D. The low frequency shift register R7 is sufficiently long to hold enough slope data to cover the entire sweep time. The two shift registers R6, R7 both function as digital delay lines.

The output of each comparator R4, R5 can be sampled respectively into the internal delay line digital shift registers R6, R7 at the clock rate of the delay line. The result is that the delay line shift registers contain the sign (e.g. 0=−,1=+) of the slope of the signal at that point in time, thus indicating whether the received signal amplitude is rising or falling.

The clock rate of each internal delay line shift register R6, R7 is determined by the highest frequency to be detected by the filter. An oversample rate is required with a higher oversample rate giving better results. An oversample rate of four times the highest frequency gives satisfactory results and an oversample rate greater that eight does not seem to contribute significant further improvement.

The amount of storage required for the delay line is a function of the oversample rate and the highest frequency component of the chirp. If no storage compression techniques are used (see below), the number of storage bits required can be calculated as the oversample rate times the highest frequency times the time duration of the signal chirp to be received. For example, for a 100 microsecond chirp pulse with a highest frequency component of 450 KHz, and an oversample rate of four, the required number of bits for delay line storage would be 180.

R8,R9-SUMMING NETWORKS: The outputs of the HIGH and LOW FREQUENCY SHIFT REGISTERS R6, R7 are summed respectively through two parallel resistor networks R8, R9. Non-inverting and inverting taps are used which correspond to the slopes of the ideal received signal. If, for example, the ideal signal was received all outputs to the summing network would be "high". Since only half of the bits in the LOW FREQUENCY SHIFT REGISTER (LFSR) R7 will contain data on the low frequency half of the signal, only this half of the shift register is used for summing. Furthermore, since the clock frequency of the LFSR R7 is half that of the clock frequency of the HFSR R6, the outputs of the LFSR R7 are multiplied by a weighting factor of 2, so that they have equal weight when considered in the time domain. This can be accomplished by allowing the value of the summing resistors of the LFSR R7 to equal one half the value of the resistors of the HFSR R6. It is not necessary to Include all the valid taps of the registers into the summing network in order to obtain satisfactory performance.

This method of matching the received and stored signal values to that of the desired ideal signal preferably uses summing network of the stored signs of slopes and comparing the summing network output value to an expected value. A simple resistor summing network is preferably used, where each point of interest in the delay line is tied to an appropriate value resistor. The ideal signal determines which polarity of the storage bit in the delay line is tie to the resistor.

Different configurations of the summing network are used in various embodiments. A simple embodiment is to tie each and every storage element to a single resistor, with the polarity being a function of the ideal signal. All resistors in this case would have the same value, and if the signal received is exactly the same as the ideal signal, the summing network would be at maximum value when the received signal sign of slope values are shifted to the corresponding delay line storage elements. A signal of opposite amplitude to the ideal signal would similarly result in the minimum summing network value, and with an appropriately chosen ideal signal a random signal should result in a midpoint value.

Another embodiment uses less than all the storage elements in the summing network, in some cases for improved performance. By eliminating those points that the ideal signal suggests are near transition points (i.e., the slope values would start to approach zero and transition to the opposite sign), better discrimination is possible. For the frequency swept chirp, the best discrimination appears to be achieved by using only those points that are peaks where the slopes would reach their maximum values (nodes). This occurs twice (once positive/once negative) per cycle of the ideal waveform.

As an example of the above delay line storage and summing network requirements, assume a (non-baseband) linearly frequency swept chirp signal of 150 Khz to 450 Khz over a period of 100 μsec. The clock frequency required for a four times oversample rate would be 1.8 Mhz, giving a nominal delay line storage requirement of 180 bits (1.8 Mhz times 100 μsec). The number of cycles would be 30, giving a total of 60 cycles. The summing network is built using one resistor per node. The values of each resistor in this case would be proportional to the distance in time between the adjacent nodes to give the correct weighting to the summing network.

In one alternative embodiment, instead of blocks R4 to R9, a commercially available matched filter is used, such as a charge-coupled transversal (matched) filter model 9602 from EG&G-Reticon.

R10-CORRELATION DETECTOR: The correlation detector R10 compares the voltage generated by the SUMMING NETWORKS R8, R9 to two predefined voltages. If these voltages are exceeded, a signal detected output is generated. The reception of the ideal signal and the reception of the amplitude inverted ideal signal will produce output voltages equal in magnitude but opposite in direction. Because of this, the correlation detector must be able to detect and distinguish a "high" or "low" correlation.

The correlation detector determines that the value of the summing network exceeds the threshold established to determine that a signal matching the ideal signal has been received. In the absence of noise, the output of the summing network would reach its maximum when a signal matching the ideal is received. With noise present, the summing network will reach some value between its maximum (or minimum for opposite amplitude) and its midpoint when the received signal containing the ideal signal is received. Other signals may also cause the summing network output to vary beyond its midpoint. It is the function of the chirp design (code sequence, bandwidth, etc.) to provide the maximum discrimination possible. Various threshold values are appropriate for particular applications.

The correlation detector for the summing resistor network preferably includes two comparators (not shown) conventionally set to the thresholds for the maximum and minimum desired. The output of the comparators is then the indication of a received ideal signal of the corresponding amplitude phase.

R11-RAW DATA/CARRIER SENSE OUT: The output of the CORRELATION DETECTOR R10 is fed directly out to the user (i.e., product specific logic 42) through the raw data out line R11. The signal is conditioned, however, so that it has a minimum pulse width, and is used to indicate the presence of a "carrier" for the product specific logic 42 needed to handle network protocols.

R12-SYNCHRONIZATION AND LOCK: The output of the CORRELATION DETECTOR R10 is fed into the synchronization and lock circuitry R12. This circuitry R12 looks for three consecutive "high" correlations each at a predefined interval. When this occurs, the circuit R12 places itself in "lock" mode. When in lock mode the circuit R12 will ignore any correlations until it opens its correlation window. If no correlations are seen by the time the correlation window is closed, the circuit R12 will fall out of lock mode and again begin looking for the synchronization pattern. If the correlation output is one clock cycle long, the correlation window will open after the elapsed time equals the sweep period minus one clock cycle, and will close after the elapsed time equals the sweep period plus one clock cycle. If the correlation output is two or three clock cycles long, then the correlation window will open after the elapsed time from the first correlation equals the sweep period and will close after the elapsed time from the first correlation equals the sweep period plus two clock cycles. This feature allows the circuit R12 to reject spurious correlations outside the correlation window, while enabling the circuit to accommodate slightly varying clock frequencies.

R13-SYNCHRONIZATION STATUS OUTPUT: The "lock"/"no lock" status of the synchronization circuitry R12 is fed out to the user 42 through the synchronization status output line R13.

The output of the comparator circuitry is therefore further processed by the above described data stream synchronizer circuitry. The data stream synchronizer limits the recognition of correlator R10 output to specific windows of time corresponding to expected correlation times as determined by the received data stream.

Because this type of above described matched filter can be used to match arbitrary frequency ranges, it can be used in applications which involve modulated carriers, either by processing the received signal through a mixer and using the matched filter at baseband, or alternately by skipping the mixer stage entirely and matching the received signal directly at its modulated frequency. The trade-off is the cost of the mixing stage versus the additional number of bits in the delay line shift register to handle the higher frequency of the modulated frequency.

R14-DATA OUTPUT: Correlations occurring in the correlation window are provided to the user (i.e., the product specific logic 42) by the data output line R14.

Figure 3:
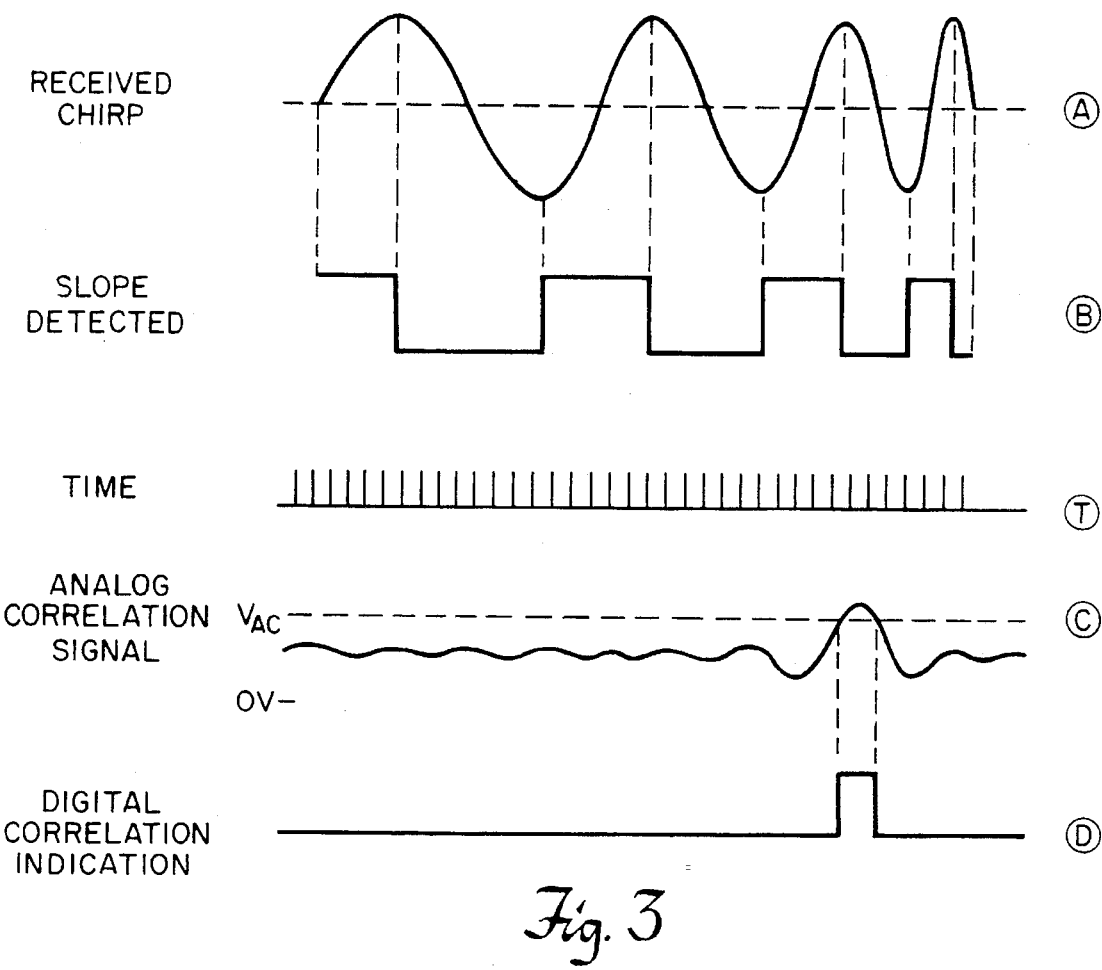
FIG. 3 shows timing diagrams for the receiver stage of FIG. 2.

FIG. 3 shows waveforms (signal amplitude versus time) for the operation of the receive stage 44 of FIG. 2. As shown in FIG. 3, waveform A shows the signal chirp received at point A designated in FIG. 2 (the amplifier R3 output). Waveform B shows the signal at point B, which is the output of the slope detector comparators R4, R5. Waveform T is an indication of time. Waveform C shows the signals at point C, which is the output of the resistor networks R8, R9. As shown, waveform C is the analog correlation signal which has a lower limit of 0 volts, and an upper threshold voltage of $V_{AC}$. Waveform D is the digital signal at the output of the correlation detector R10 at point D; waveform D is either a "zero" chirp or a "one" chirp.

The following describes the TRANSMIT stage 46.

S1-DATA IN: DATA IN line S1 accepts strobed data from user 42. If the DATA BUFFER FULL line S1 is set, all strobed data will be ignored.

S2-DATA BUFFER: DATA BUFFER S2 is a one-bit "double buffer" allowing the user 42 to queue up the next bit of data while the previous bit is still being transmitted, This allows for continuous data transmission and is necessary for maintained synchronization. When the COUNTER S4 has reached its terminal count, data is loaded from the BUFFER S2, the COUNTER S4 is cleared and started, and the DATA BUFFER S2 is cleared. If no data is present in the DATA BUFFER S2 when terminal count is reached, transmission is halted until further data is loaded. One complete counting cycle of the COUNTER S4 corresponds to the transmission of the swept waveform.

S3-DATA BUFFER FULL,: Line S3 alerts the user 42 that the DATA BUFFER S2 has been filled. If the DATA BUFFER FULL line S3 has been set, any further data presented on the DATA IN line SI is ignored.

S4-COUNTER: Counter S4 is a nine bit counter driven by clock S4C which generates consecutive addresses. These address the ROM S6 which contains a lookup table holding values proportional to the transmit waveform voltages.

S5-TERMINAL COUNT DECODE LOGIC: Logic S6 generates an appropriate signal when the terminal count of the counter S4 has been reached. This state corresponds to the completion of a sweep transmission.

S6-ROM: The chirp pattern ROM S6 (read only memory) is addressed by the COUNTER S4 and contains a lookup table whose values are proportional to the swept waveform voltages.

S7-DATA SELECT &ENABLE: Logic S7 performs amplitude inversions on the binary values present at the ROM S6 output. Inversion is selected/deselected by the level of the DATA line.

S8-LATCH: Latch S8 holds the output value of the DATA SELECT & ENABLE S7 while the ROM S6 address is being redefined.

S9-SUMMING NETWORK: Summing network S9 is a binary weighted resistor summing network which generates a voltage proportional to the magnitude of the binary value presented at its inputs. Thus latch S8 and summing network S9 together are a digital-to-analog converter.

S10-POWER AMPLIFIER: Power amplifier S10 provides the necessary drive current to drive the secondary winding of the ISOLATION TRANSFORMER R1 (i.e., line coupler R1) with a voltage proportional to the output of the SUMMING NETWORK S9.

FIG. 2 also shows transmit/receive selector line S11.

Figure 4:
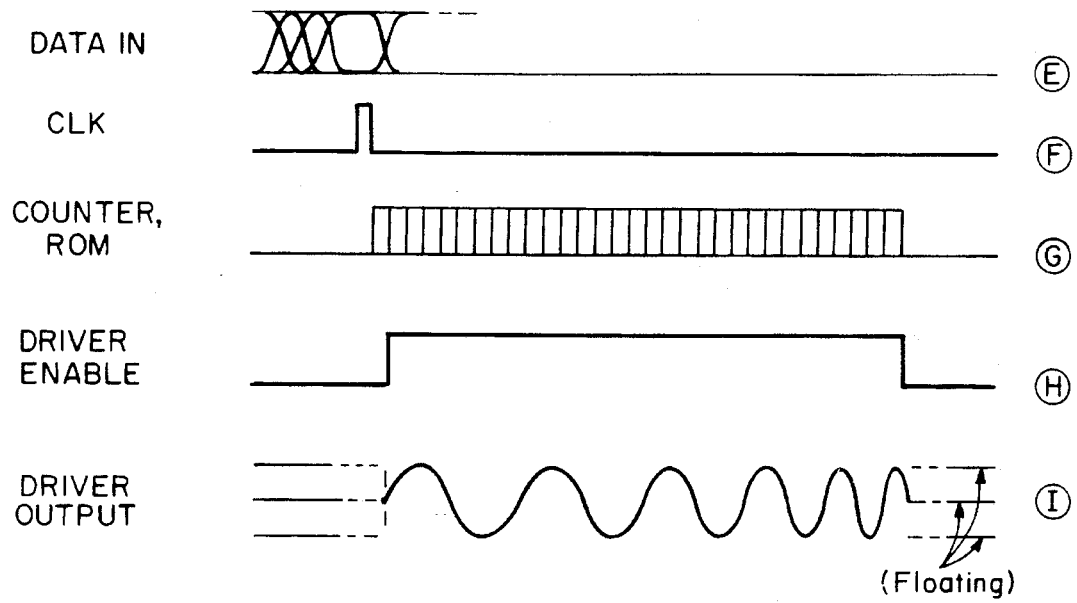
FIG. 4 shows timing diagrams for the transmitter stage of FIG. 2.

FIG. 4 shows waveforms for the operation of the transmitter stage. Waveform E is the data signal supplied from the product specific logic 42 (see FIG. 1) at point E of FIG. 2. Waveform F is the input clock signal at point F. Waveform G is the output signal from the counter S4 at point G. Waveform H is the driver enable signal provided by the terminal count decode logic S5 to the line driving amplifier S10 at point H. Waveform I is the driving amplifier S10 output signal (i.e., the wave signal on the AC powerline) at point I. As shown, the signal at point I is floating (i.e., indeterminate) when the driving amplifier S10 is not enabled.

The psuedo-random code sequence modulation referred to above conventionally has the frequency spectrum characteristics of a bandspread of twice the modulating code rate between first zero nodes centered on the carrier frequency, corresponding to the two sidebands of the modulating code. The shape of the power spectrum would be (sin x)/x with the 3 db bandwidth of the signal approximately 0.88 times the code rate.

The frequency spectrum produce by a swept frequency chirp is effectively a single sideband signal, as opposed to the dual sideband signal of the psuedo-random code. The shape of the power spectrum will be rectangular over the frequencies being swept and the edges of the spectrum are sharp. Thus the use of the given bandwidth is much more effective with the swept frequency chirp. This may be advantageous in applications where available bandwidth is narrow and the absence of spectral spillover is an important consideration.

For the sign of slope detector in the case of a psuedo-random code sequence chirp, the optimal RC value is constant. The optimal slope time of the RC time constant is determined by the carrier frequency, and is one-half the period of the carrier. The summing network should use all but the element corresponding to the ideal signal carrier phase changes in the delay line storage to get optimal results.

The RC time constant for the swept frequency chirp is ideally not constant. Theoretically it should be different for each frequency. To accommodate the need for a varying RC time constant for optimal results, one of two techniques are preferably used. First, the filter is divided into several sections corresponding to the different optimal slope times. For example, in a filter designed for a 150 Khz–450 Khz swept signal, two slope comparators R4, R5 and two corresponding delay lines R6, R7 are used—one of each for the higher frequencies and one of each for the lower frequencies. This is the circuitry shown in FIG. 2. Two sections provide an adequate performance for this particular chirp. For chirps having more octaves of range (i.e., wider bandwidth), the filter preferably is divided into more sections.

If the chirp is swept from low to high frequency, the high frequency delay line R6 need contain only as many bits as there are high frequency sample points (e.g. one-half) since they are received last, and the low frequency delay line R7 can be clocked at a lower rate (e.g. one-half) therefore requiring less storage bits. The result for a filter for the chirp described is the amount of storage required is the same as if there was one delay line clocked at the higher frequency (180 bits).

An alternate technique is to convert the received high frequency slopes to longer time slopes in the delay line register. This can be accomplished by combining multiple stored slopes into one slope element to estimate the sign of the longer time slope. The same number of bits can be used in the delay line shift register, simply converting them to longer slope times at various points in the shift register. Alternately, since the longer slope times reflect lower frequencies, when conversion is made to the longer slope times, they can also be correspondingly compressed in time without losing resolution in the summing network. The result is a potential savings of storage bits in the delay line shift register by using in effect multiple sequential shift registers at decreasing clock rates, The above description of the invention is illustrative and not limiting. Other embodiments of the invention are within the following claims.

We claim:

1. A method of transmitting sequences of information symbols on a communications channel between any of a plurality of transmitters and at least one receiver connected to the communications channel, comprising the steps of each transmitter transmitting a sequence of predetermined wide band signals, each transmitter resolving contention for use of the communications channel by sensing, prior to or during transmission of the sequence, for the presence on the communications channel of a said predetermined wide band signal transmitted by another transmitter, wherein the step of sensing for the presence of a predetermined wide band signal transmitted by another transmitter comprises using a filter that, without prior synchronization, produces an output indicative of receipt of a wide band signal.

2. The method of claim 1 wherein the predetermined wide band signals are used for contention resolution and for transmission of the information symbols.

3. The method of claim 2 wherein the receiver reconstructs the sequences of information symbols by a method comprising the steps of:

receiving signals from the communications channel and processing the received signals using a filter that, without prior synchronization, produces a filter output indicative of receipt of a wide band signal;

successively repeating the step of receiving signals to produce a sequence of filter outputs; and processing the sequence of filter outputs to reconstruct the sequence of information symbols.

4. The method of claim 3 wherein the same filter used by the receiver is used by the transmitter in the sensing step.

5. The method of claim 1, 3 or 4 wherein the filter comprises a matched filter.

6. The method of claim 5 wherein the matched filter is of the same time length as that of the transmitted wide band signal.

7. The method of claim 6 wherein the matched filter comprises a delay line.

8. The method of claim 5 further comprising a correlation detector for comparing the signals obtained by the matched filter to a predetermined signal level.

9. The method of claim 5 wherein the matched filter comprises a sign of slope filter.

10. The method of claim 1, 3, or 4 wherein the wide band signal is a spread spectrum chirp.

11. The method of claim 10 wherein the spread spectrum chirp is frequency swept.

12. The method of claim 10 wherein the information symbol is a single bit, and wherein each state of the bit is represented by a chirp identical except for a 180 degree difference in phase.

13. The method of claim 12 wherein the filter uses the same correlation network to generate a correlation output with a polarity reflecting which of the two states of the bit has been received.

14. The method of claim 11 wherein the spread spectrum chirp comprises at least one linearly swept portion.

15. The method of claim 10 wherein the spread spectrum chirp is a direct sequence code generated chirp.

16. The method of claim 10 wherein each information symbol is represented by multiple chirps.

17. The method of claim 1, 3 or 4 wherein the communications channel is a carrier-sense, multi-access network with contention resolution.

18. The method of claim 10 wherein the information sequences are packets of information symbols.

19. The method of claim 1, 3 or 4 wherein the sequence of wide band signals does not contain a synchronization portion.

20. The method of claim 1, 3 or 4 wherein the communications channel comprises a power line.

21. The method of claim 1 wherein the sequence of signals is transmitted at a uniform, predetermined rate and wherein each receiver, following a synchronization with at least one signal, uses the predetermined rate to lock synchronization for at least a plurality of further signals.

22. The method of claim 1, 3 or 4 wherein the sequence of signals is transmitted at a uniform, predetermined rate and wherein each receiver, following a synchronization with at least one signal, goes into a lock mode in which the receiver uses the predetermined rate to examine the output of the filter only during windows separated by a time period and synchronized with the expected times of receipt of successive signals.

23. The method of claim 22 wherein at least one signal comprises an initial sequence of symbols of a data packet.

24. The method of claim 23 wherein the sequence of wide band signals comprises a contention resolution preamble followed by data.

25. The method of claim 1, 3 or 4 wherein the sequence of wide band signals comprises a contention resolution preamble followed by data.

26. The method of claim 22 wherein the time period between windows is adjusted to allow the receiver to track a transmitter transmitting at frequencies within a frequency error range.

27. The method of claim 22 wherein, following a failure to receive a signal within the window, the receiver falls out of the lock mode and begins looking for a synchronizing pattern.

28. The method of claim 1, 3 or 4 wherein each of the information symbols corresponds to a unique wide band signal.

29. The method of claim 26 wherein the information symbols are bits, and each bit corresponds to at least one wide band signal.

30. The method of claim 5 wherein the communications channel is a portion of a carrier-sense, multiple-access network with contention resolution.

31. The method of claim 30 wherein the communications channel comprises a power line.

32. The method of claim 10 wherein the communications channel is a portion of a carrier-sense, multiple-access network with contention resolution.

33. The method of claim 32 wherein the communications channel comprises a power line.

34. The method of claim 19 wherein the wide band signal is a spread spectrum chirp.

35. The method of claim 34 wherein the communications channel comprises a power line.

36. The method of claim 22 wherein the wide band signal is a spread spectrum chirp.

37. The method of claim 36 wherein the communications channel comprises a power line.

38. Apparatus for transmitting sequences of information symbols on a communications channel between any of a plurality of transmitters and at least one receiver connected to the communications channel, comprising:

means at each transmitter for transmitting a sequence of predetermined wide band signals, the timing of the sequence of signals transmitted by at least one transmitter being asynchronous relative to that of at least one other transmitter, means at each transmitter for resolving contention for use of the communications channel by sensing, prior to or during transmission of the sequence, for the presence on the communications channel of a said predetermined wide band signal transmitted by another transmitter, including a said signal with timing asynchronous to that of the sequence of signals generated by that transmitter, wherein sensing for the presence of a predetermined wide band signal transmitted by another transmitter comprises using a filter that, without prior synchronization, produces an output indicative of the degree of correlation between a received signal and the predetermined wide band signal.

39. The apparatus of claim 38 wherein the same predetermined wide band signals are used for contention resolution and for transmission of the information symbols.

40. The apparatus of claim 39 wherein the receiver comprises circuitry configured to reconstruct the sequences of information symbols by receiving signals from the communications channel and processing the received signals using a filter that, without prior synchronization, produces a filter output indicative of the degree of correlation between a said received signal and a said chirp signal; wherein the circuitry is configured to successively receive signals to produce a sequence of filter outputs and to process the sequence filter outputs to reconstruct the sequence of information symbols.

41. The apparatus of claim 40 wherein the same filter used by the receiver is used by the transmitter for sensing.

42. The apparatus of claim 38, 40 or 41 wherein the filter comprises a matched filter.

43. A method of transmitting a sequence of information symbols on a communications channel between a plurality of transmitters and at least one receiver, comprising the steps of:

representing the sequence of information symbols as a sequence of predetermined spread spectrum chirps;

performing a contention resolution process in which a transmitter senses whether other transmitters are transmitting;

following a successful contention resolution transmitting the sequence of chirps from the transmitter to the communications channel;

receiving signals from the communications channel at the receiver and processing the received signals using a filter that, without prior synchronization, produces a filter output indicative of the degree of correlation between a said received signal and a said chirp;

successively repeating the step of receiving signals to produce a sequence of filter outputs; and processing the sequence of filter outputs to reconstruct the sequence of information symbols.

44. Apparatus for transmitting a sequence of information symbols on a communications channel between a plurality of transmitters and at least one receiver, comprising:

a transmitter configured to represent the sequence of information symbols as a sequence of predetermined spread spectrum chirps, to contend for access to the communications channel by sensing whether other transmitters are transmitting, and following a successful contention resolution to transmit the sequence of chirps on the communications channel;

a receiver configured to receive signals from the communications channel and to process the received signals using a filter that, without prior synchronization, produces a filter output indicative of the degree of correlation between a said received signal and a said chirp;

the receiver being configured to successively process received signals to produce a sequence of filter outputs, and to process the sequence of filter outputs to reconstruct the sequence of information symbols.

* * * * *

UNITED STATES PATENT AND TRADEMARK OFFICE
CERTIFICATE OF CORRECTION

PATENT NO.   : 5,574,748

DATED        : November 12, 1996

INVENTOR(S)  : James E. Vander Mey and Timothy J. Vander Mey

It is certified that error appears in the above-identified patent and that said Letters Patent is hereby corrected as shown below:

Cover page, [54] Title, "NETWORK" should be --NETWORKS--.

Cover page, [56] References Cited, U.S. PATENT DOCUMENTS, insert the following reference:

--4,307,380  12/22/81  Gander . . . . . 340.310R--.

Cover page, [56] References Cited, OTHER PUBLICATIONS, in the "Piety" reference, "Hewlwtt" should be --Hewlett--.

Col. 1, line 2, "NETWORK" should be --NETWORKS--.

Col. 1, line 47, "hold" should be --hop--.

Col. 4, line 7, the second occurrence of "50" should be --450--.

UNITED STATES PATENT AND TRADEMARK OFFICE
CERTIFICATE OF CORRECTION

PATENT NO.   : 5,574,748

DATED        : November 12, 1996

INVENTOR(S)  : James E. Vander Mey and Timothy J. Vander Mey

It is certified that error appears in the above-identified patent and that said Letters Patent is hereby corrected as shown below:

Col. 9, line 40, "Include" should be --include--.

Col. 11, line 61, "transmitted," should be --transmitted.--.

Col. 12, line 4, "FULL,:" should be --FULL:--.

Col. 13, line 46, "rates," should be --rates.--.

Col. 14, line 48, "multi-access" should be --multiple-access--.

Col. 15, line 22, "claim 26" should be --claim 28--.

Signed and Sealed this

Seventeenth Day of June, 1997

Attest:

Attesting Officer

BRUCE LEHMAN

Commissioner of Patents and Trademarks